United States Patent
Kim (10) Patent No.: US 8,130,411 B2
(45) Date of Patent: Mar. 6, 2012

(54) IMAGE FORMING APPARATUS AND METHOD WITH COLOR DIFFERENCE AND GRAY LEVEL COMPENSATION AND USE OF ADJUSTED GRAY LEVEL CONVERSION TABLE

(75) Inventor: Young Mi Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 782 days.

(21) Appl. No.: 12/038,220

(22) Filed: Feb. 27, 2008

(65) Prior Publication Data

US 2008/0218781 A1   Sep. 11, 2008

(30) Foreign Application Priority Data

Mar. 6, 2007   (KR) .................... 10-2007-0022180

(51) Int. Cl.
*H04N 1/407*   (2006.01)
*H04N 1/60*   (2006.01)

(52) U.S. Cl. ........ 358/1.9; 358/3.21; 358/504; 358/519; 358/521; 358/406

(58) Field of Classification Search .................... 358/1.9, 358/3.21, 3.23, 3.24, 504, 519, 521, 523, 358/406, 461, 3.01, 1.7, 1.13, 468, 300; 399/14, 399/15, 43, 47, 49, 51, 52, 72, 81; 347/131, 347/132, 135, 237, 240, 247, 251–254
See application file for complete search history.

(56) References Cited

U.S. PATENT DOCUMENTS

| | | | | |
|---|---|---|---|---|
| 4,942,407 | A | * | 7/1990 | Tadokoro ...................... 347/252 |
| 5,754,683 | A | * | 5/1998 | Hayashi et al. ............... 358/504 |
| 6,008,907 | A | * | 12/1999 | Vigneau et al. ................ 358/1.9 |
| 6,061,144 | A | * | 5/2000 | Mamizuka .................... 358/1.9 |
| 6,072,512 | A | * | 6/2000 | Fukasawa .................... 347/131 |
| 6,271,934 | B1 | * | 8/2001 | Hayashi ......................... 358/1.9 |
| 7,180,625 | B2 | * | 2/2007 | Nakamura .................... 358/504 |
| 7,395,002 | B2 | * | 7/2008 | Funayama et al. ............. 399/49 |
| 2001/0015815 | A1 | * | 8/2001 | Hada et al. ..................... 358/1.9 |
| 2007/0024657 | A1 | * | 2/2007 | Zhang et al. ................... 347/19 |
| 2008/0204816 | A1 | * | 8/2008 | Miyazaki ...................... 358/406 |
| 2009/0067870 | A1 | * | 3/2009 | Hamanaka ..................... 399/72 |

FOREIGN PATENT DOCUMENTS

| | | | |
|---|---|---|---|
| JP | 08095370 A | * | 4/1996 |
| KR | 2002-41697 | | 6/2002 |
| KR | 2006-32677 | | 4/2006 |

* cited by examiner

*Primary Examiner* — Scott A Rogers
(74) *Attorney, Agent, or Firm* — Staas & Halsey LLP (57) ABSTRACT

Stored reference patch data are outputted, and a gray level of the reference patches obtained by scanning the outputted reference patches is compared with a reference level, such that a conversion table for storing gray level setting information is modified according to the comparison result. A driving condition of a light source for the light exposure is set by a user interface to newly set a print density of an image forming apparatus. Moreover, prior to the user setting, test printing is performed and the print density can be set according to a result of the test printing.

19 Claims, 9 Drawing Sheets

IMAGE FORMING APPARATUS AND METHOD WITH COLOR DIFFERENCE AND GRAY LEVEL COMPENSATION AND USE OF ADJUSTED GRAY LEVEL CONVERSION TABLE

CROSS-REFERENCE TO RELATED APPLICATION

This application claims the benefit of Korean Patent Application No. 2007-22180, filed in the Korean Intellectual Property Office on Mar. 6, 2007, the disclosure of which is incorporated herein by reference.

BACKGROUND OF THE INVENTION

1. Field of the Invention

Aspects of the present invention relate to an image forming apparatus for and a method of properly setting a gray level of print data, and more particularly, to setting print density according to the demand of a user.

2. Related Art

An electro-photographic image forming apparatus transforms color coordinates of color component data RGB of an input image into CMYK print data and provides the print data to a printer engine so as to print a corresponding image. The image may be scanned by a scanner or received from a host computer. Although the electro-photographic image forming apparatus should print an image identical to the original image, as a result of differences in printer types, the printed image may have different colors due to characteristics of hardware, print sheets, and developer agents.

Korean Patent Unexamined Application Publication Nos. 2002-41697 and 2006-32677 disclose methods of using a color profile in order to compensate for the difference in color. According to the method in the 2002-41697 reference, a source color table as a reference of colors in a computer is outputted to a printer, and a color chart outputted to the printer is scanned by a scanner to create an output color table. Errors between the source color table and the output color table are extracted and stored in a printer compensation color table. The error values of the printer compensation color table are applied to a corresponding color value when outputting an actual image so as to compensate for the errors. The method in the 2006-32677 reference estimates an error of image data corresponding to a print color chart printed by image data corresponding to a reference color chart and a print color table to which a color profile is applied, and modifies the color profile such that the print colors are changed into the reference colors based on the estimated error.

Generally, when color component data is converted into the print data, the colors are compensated and a gray level is set using a conversion table. However, a gray level that determines brightness of a printed image may not be set properly due to various factors. These factors include ambient temperature and humidity of the apparatus, age of the apparatus, and apparatus type. The references described above do not disclose setting the gray level. If the gray level is not set properly, image reproducing quality in relation to the brightness may be reduced.

Demand exists to reproduce a source image accurately as well as to allow a user to adjust the print density of the printed image. Since the conventional method does not enable the user to adjust the print density of the apparatus, the user's desire to change the print density of the printed image cannot be accommodated.

SUMMARY OF THE INVENTION

Aspects of the invention provide an image forming apparatus to set a gray level properly based on characteristics of the apparatus and a control method thereof.

Additional aspects of the invention provide an apparatus for preventing an image forming apparatus to control an operation condition of a light source for exposure to set a print density condition of the image forming apparatus according to a demand of a user, and a control method thereof.

According to an aspect of the present invention, an image forming apparatus is provided. The image forming apparatus comprises a printer engine to printing an image onto a printable medium, a reference patch storage unit to store reference patch data for compensating an outputted image of the printer engine; an image input unit to scan the reference patch printed based on the reference patch data; and an image processor to set a gray level of print data according to a result of comparing gray level information obtained from the scanned reference patch with reference gray level information.

According to another aspect of the present invention, the image processor comprises a gray level compensator to modify stored information such that an optical density of a grade of the print data varies linearly.

According to another aspect of the present invention, the image processor further comprises a conversion table to store gray level setting information, and a gray level compensator to modify the gray level setting information according to a difference between the gray level obtained from the scanned reference patch and the reference gray level information.

According to another aspect of the present invention, an image forming apparatus is provided. The apparatus comprises a printer engine to print onto a printable medium, a reference patch storage unit to store reference patch data for adjusting print data corresponding to the image to be printed by the printer engine; an image input unit to scan a reference patch printed based on the reference patch data and to receive color component data corresponding to the print data; an image processor to convert the color component data into the print data; a printer engine controller to provide the print data to the printer engine and to control the printer engine according to a user setting command; and a user interface to provide, to the printer engine controller, the user setting command for setting a print density of the image forming apparatus.

According to another aspect of the present invention, the printer engine comprises a light source, and the user interface sets an intensity of an optical power applied to the light source corresponding to the print density.

According to another aspect of the present invention, the printer engine controller makes intensities of optical powers, applied to the light source, different from each other according to the print density to perform a test printing of a plurality of reference charts, and sets the print density selected by a user.

According to another aspect of the present invention, the printer engine comprises a light source, and the user interface sets a pulse width of a pulse width modulation signal for driving the light source corresponding to the print density.

According to another aspect of the present invention, the printer engine controller makes pulse widths of pulse width modulation signals, applied to the light source, different from each other according to the print density to perform a test printing of a plurality of reference charts, and sets the print density selected by a user.

According to another aspect of the present invention, a control method of an image forming apparatus comprising a printer engine to receive print data and to print an image corresponding to the print data onto a printable medium is provided. The control method comprises printing a reference patch based on reference patch data for compensating an image printed by the printer engine; scanning the printed reference patch; adjusting a conversion table to store gray level setting information according to a difference between a gray level obtained from the scanned reference patch and a pre-stored reference level; and performing the printing by applying a gray level set based on the adjusted conversion table.

According to another aspect of the present invention, storage information of the conversion table is modified such that an optical density of a grade of the print data varies linearly.

According to another aspect of the present invention, a control method of an image forming apparatus comprising a printer engine to print an image onto a printable medium, a printer engine controller to control the printer engine, and a user interface to provide a user setting command to the printer engine controller, is provided. The control method comprises receiving information about a print density through the user interface when a user setting command setting the print density is inputted; setting a driving condition of a light source, used to print the image, according to the received print density; and printing the image onto the printable medium according to the predetermined driving condition of the light source.

According to another aspect of the present invention, the control method further comprises printing a plurality of reference patches by individually applying a plurality of predetermined test print densities prior to setting the print density; selecting one of the reference patches from the printed reference patches; and setting a test print density corresponding to the selected reference patch as the print density.

According to another aspect of the present invention, the predetermined driving condition of the light source is set by varying an intensity of an optical power applied to the light source.

According to another aspect of the present invention, the predetermined driving condition of the light source is set by varying a pulse width of a pulse width modulation signal for driving the light source.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
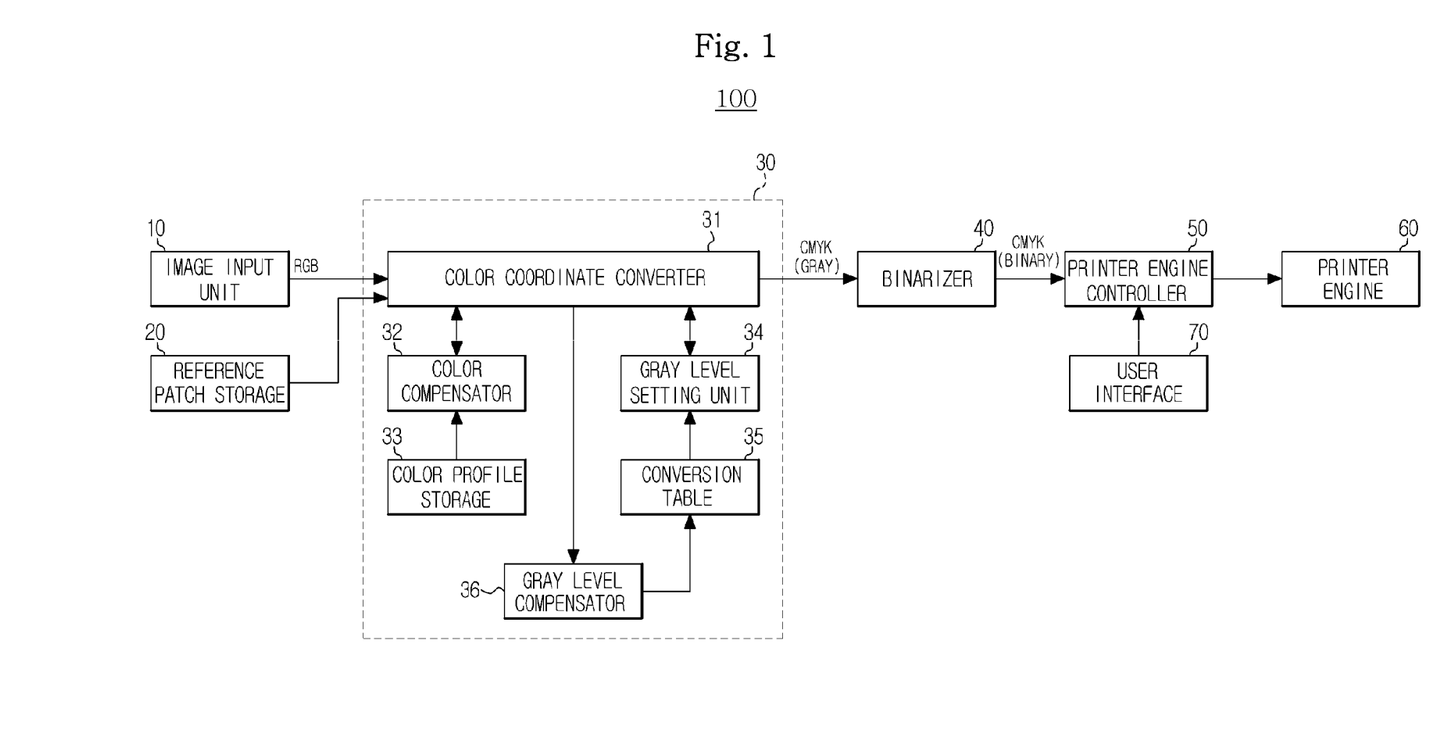
FIG. 1 is a block diagram illustrating an image forming apparatus according to an example embodiment of the present invention.

FIG. 1 is a block diagram of an image forming apparatus 100 according to an example embodiment of the present invention. The image forming apparatus 100 includes an image input unit 10, a reference patch storage 20, an image processor 30, a binarizer 40, a printer engine controller 50, a printer engine 60, and a user interface 70. The image forming apparatus 100 according to other aspects of the invention may include additional and/or different components. Similarly, the functionality of two or more of the above units may be combined into a single component. The image forming apparatus 100 may be any apparatus that forms an image onto a printable medium, such as a printer, a facsimile machine, or a multifunction device.

The image input unit 10 obtains an image to be printed. The image input unit 10 may be, for example, a scanner, a digital camera, a host computer, or any device capable of obtaining image data to be printed. The reference patch storage 20 stores information about an optical density (OD) patch corresponding to grades of a predetermined range (0% to 100%) for compensation of a gray level in addition to a sample image for color compensation.

The image processor 30 includes a color coordinate converter 31, a color compensator 32, a color profile storage 33, a gray level setting unit 34, a conversion table 35, and a gray level compensator 36. The color coordinate converter 31 converts color component data of an input image into the print data. The color coordinate converter 31 compensates colors and outputs the gray-scale print data CMYK to which a gray level is set to the binarizer 40. The color compensator 32 compensates colors using the color profile stored in the color profile storage 33 when colors of the print data are compensated.

When setting a gray level with respect to the print data, the gray level setting unit 34 sets the gray level using gray level setting information stored in the conversion table 35, such that the gray level within a predetermined range, for example, a level 0 (zero) to a level 255, corresponds to a grade of the print data. As such, due to the gray level setting information stored in the conversion table 35, a characteristic of the gray level is determined. The gray level setting information is initially optimized and stored.

The initially stored gray level setting may not be proper due to various factors, such as the environment of the apparatus (e.g., pressure, temperature, humidity, etc.), the age of the apparatus, or characteristics of the apparatus. The gray level compensator 36 can compensate for these factors. The gray level compensator 36 modifies the gray level setting information of the conversion table 35 in order to compensate for differences between the gray level setting and the reference level. When the gray level setting information of the conversion table 35 is modified, the gray level characteristic is changed and influences the brightness of the printed image.

The reference patch storage 20 stores information about a reference patch for the compensation of the gray level. When the printing is performed based on the reference patch, as shown in FIG. 2a, a reference curve Rr is obtained in which optical density increases linearly in proportion to the grade.

Figure 2A:
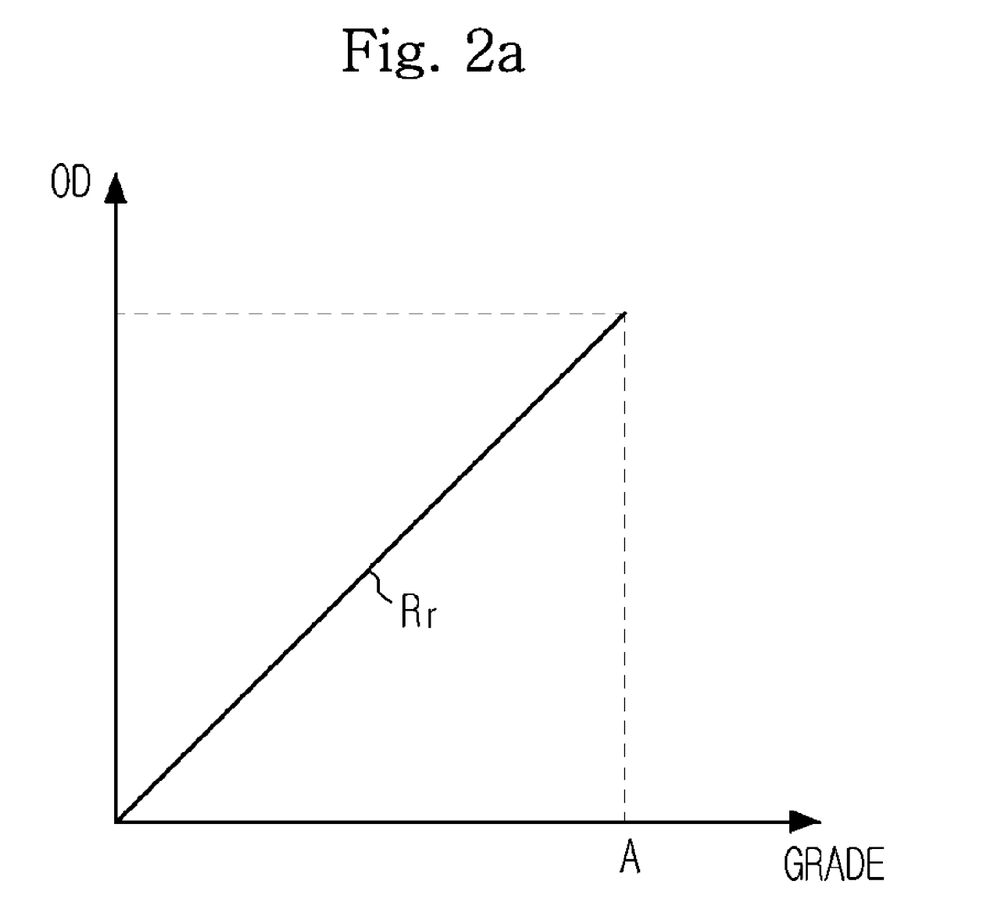
FIGS. 2a to 2c are graphs illustrating optical density with respect to grades of print data and illustrating an operation of compensating a gray level setting according to an example embodiment of the present invention.
Figure 2B:
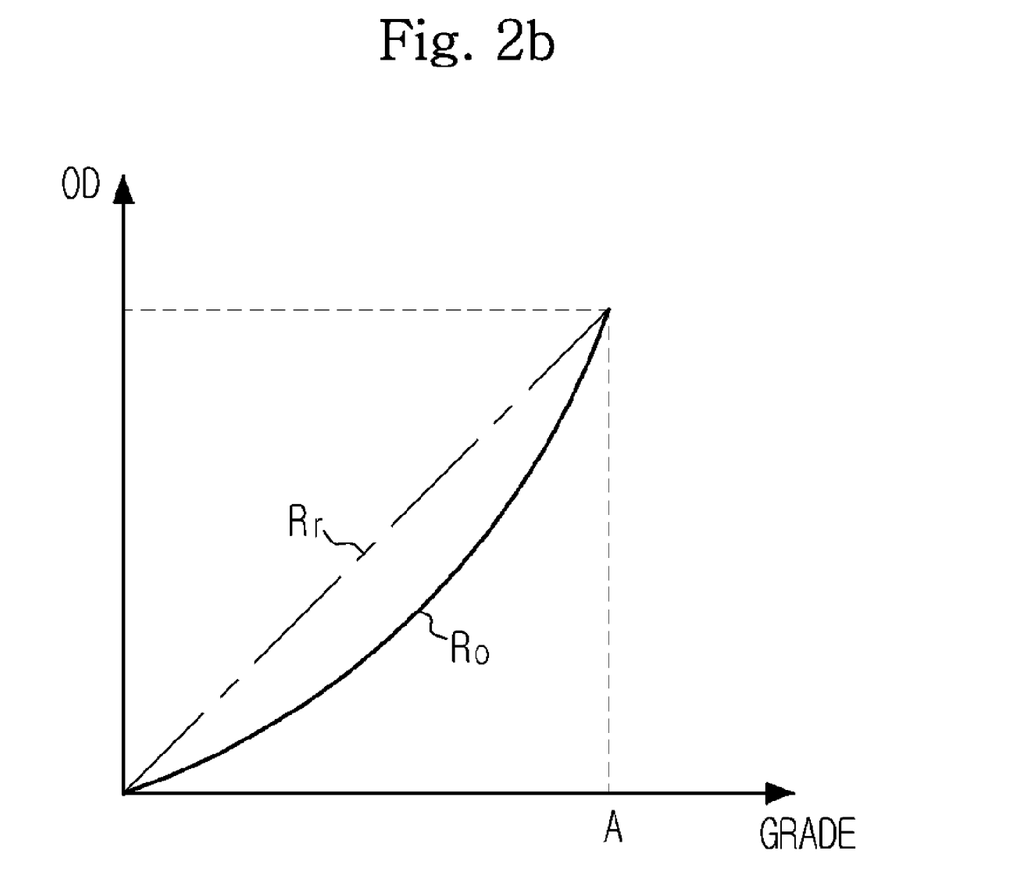

However, if the gray level setting information of the conversion table 35 is not proper, a target curve Ro, shown in FIG. 2b, is obtained when the printing is performed based on the reference patch information. The target curve Ro is different from the reference curve Rr in FIG. 2a. This difference negatively affects the brightness of the printed image.

In order to compensate for the difference, the gray level compensator 36 estimates a difference between the reference curve Rr and the target curve Ro based on previously stored information about the reference curve Rr and information about the target curve Ro estimated by scanning a reference patch. The gray level compensator 36 modifies the gray level setting information of the conversion table 35 in order to compensate for the differences. The gray level compensator 36 modifies the gray level setting information based on a compensation curve Rc shown in FIG. 2c, in which the compensation curve Rc is symmetrical to the target curve Ro about the reference curve Rr.

Figure 2C:
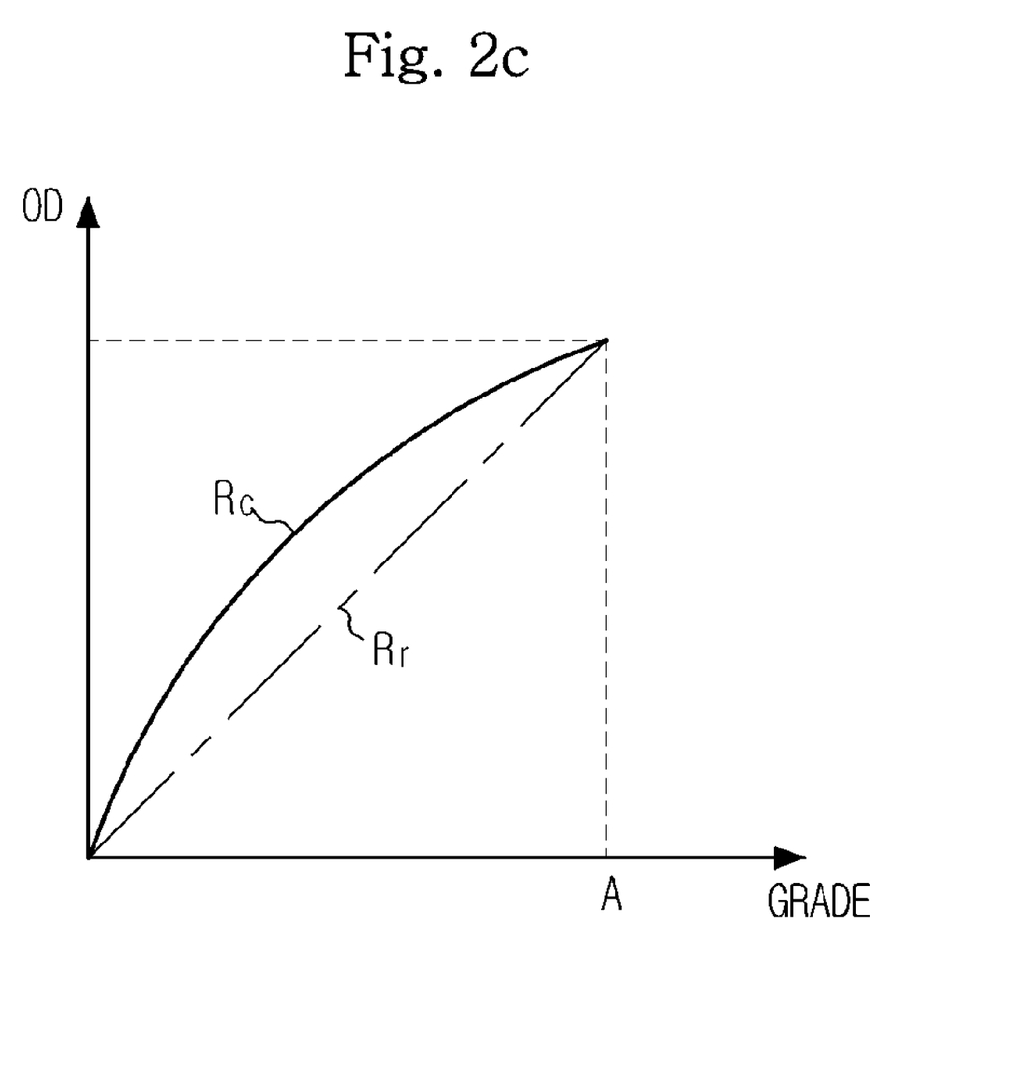

After the gray level is set based on the compensation curve shown in FIG. 2c, due to the gray level setting information of the conversion table 35, the printed image to which the reference curve Rr of FIG. 2a is applied has a brightness regardless of the factors affecting the brightness.

The binarizer 40 binarizes the gray scale print data to be printed. The printer engine controller 50 provides the binarized print data to the printer engine 60. The printer engine 60 performs a series of printing operations such as light exposure, development, image transfer, and fixing, according to the print data, to form an output image.

The printer engine 60 employs, for example, an electrophotographic method to output light from the light source to form an electrostatic latent image on a photo-sensitive body according to the binarized print data. When varying intensity of an optical power applied to the light source (for example, a laser diode) to emit light for the light exposure process, a size of dots of the latent image formed by the light varies so that the print density of a printed image varies.

Figure 3:
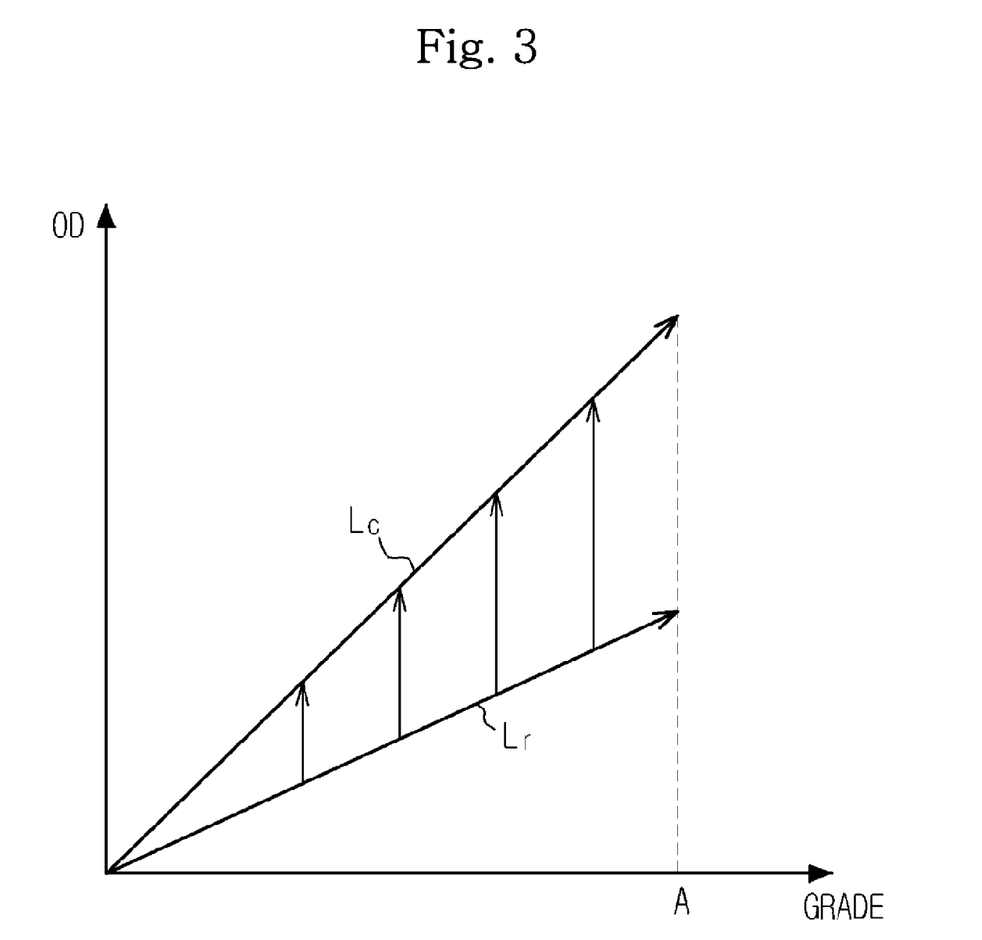
FIG. 3 is a view illustrating setting an optical power applied to a light source for exposure according to an example embodiment of the present invention.

As illustrated in FIG. 3, the grades of print densities when a reference optical power Lr is applied to the light source and when an optical power Lc with an increased intensity is applied to the light source are different from each other. When printing is performed by applying the increased optical power, the brightness of the image may not be the same as the source image. However, the user may apply increased optical power to adjust the brightness of the image to a preferred level.

Figure 4:
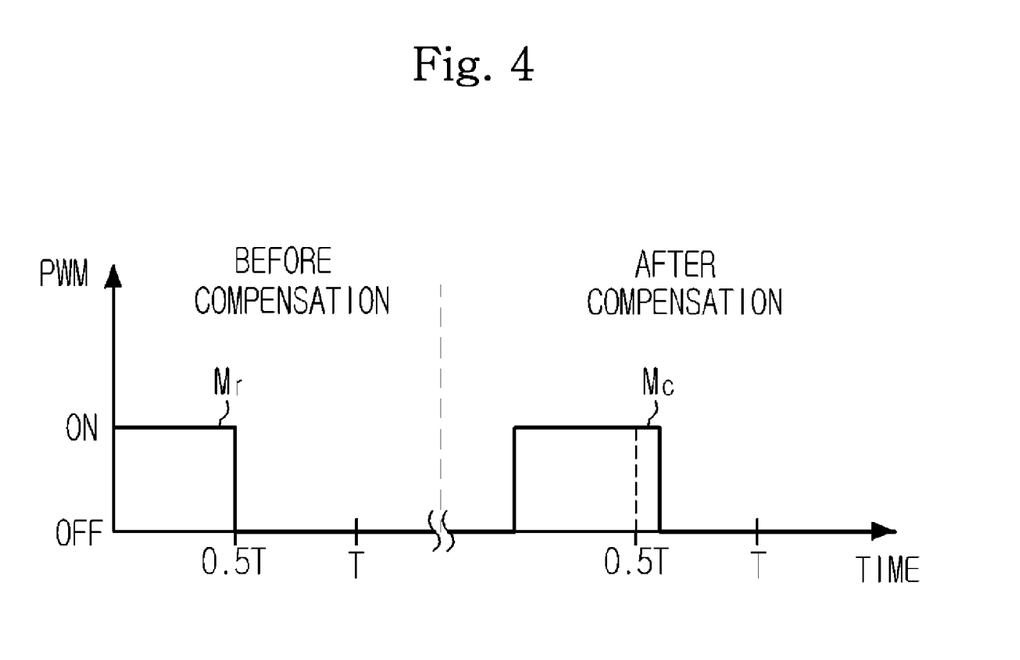
FIG. 4 is a view illustrating setting a pulse width modulation signal to drive the light source for exposure according to an example embodiment of the present invention.

When applying a pulse width modulation of a signal to drive the light source according to the print data, the print density of the image to be printed may vary by controlling a pulse width. As shown in FIG. 4, for example, although the printer engine controller 50 is set to output a predetermined reference pulse width modulation signal Mr to the printer engine 60, the printer engine controller 50 may be modified to output an increased reference pulse width modulation signal Mc with a pulse width greater than a pulse width of the reference pulse width modulation signal Mr. The size of the dots printed on the printable medium varies to change the print density, such that a modified pulse width modulation signal for varying an on-time of the light source is outputted rather than the predetermined reference pulse width modulation signal.

When the printing is performed by applying the pulse width modulation signal modifying the reference pulse width modulation signal, the brightness of the printed image may not be same as the brightness the source image. However, the user may apply the increased optical power so as to adjust the brightness to a preferred level. When the user sets the print density by changing the intensity of the optical power applied to the light source and/or by changing the pulse width modulation signal, the user makes the adjustments through the user interface 70. The user sets the print density using the user interface 70 such that the user interface 70 applies a user setting command for setting the print density to the printer controller 50.

Figure 5:
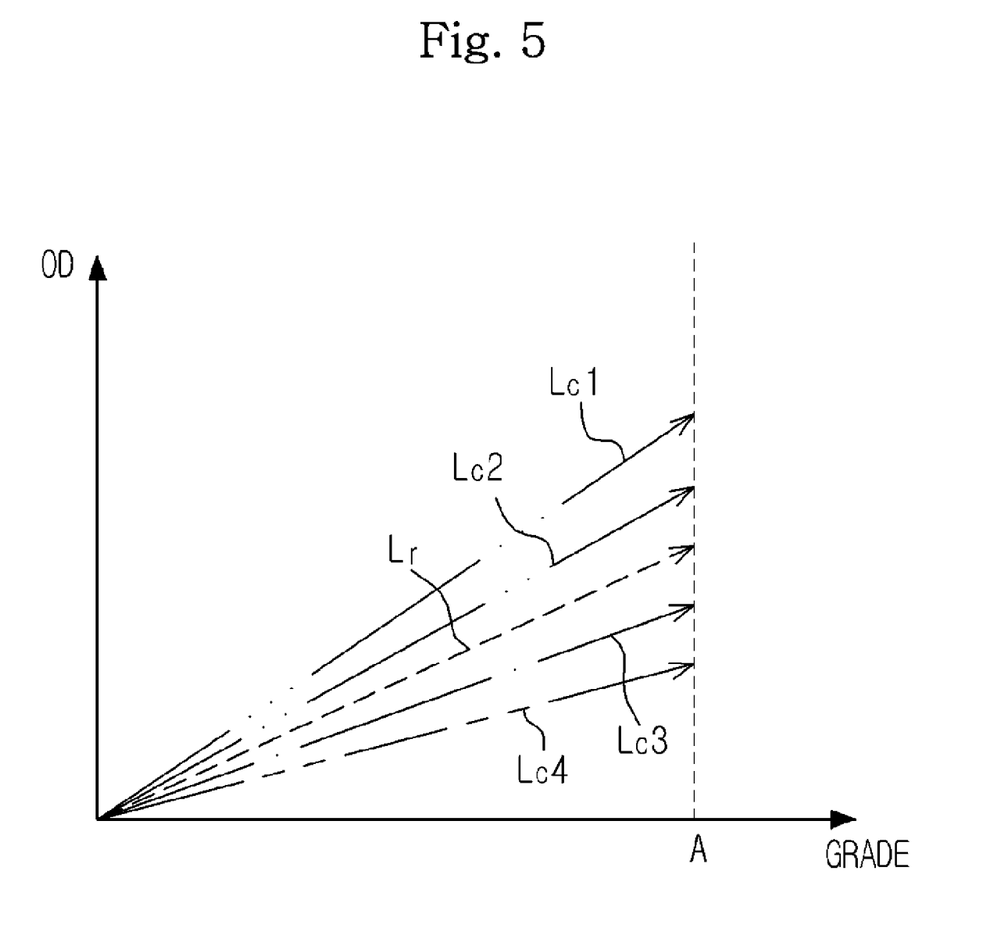
FIG. 5 is a view illustrating a plurality of optical powers applied to a light source in order to obtain a plurality of reference patches for selecting a print density by a user according to an example embodiment of the present invention.
Figure 6:
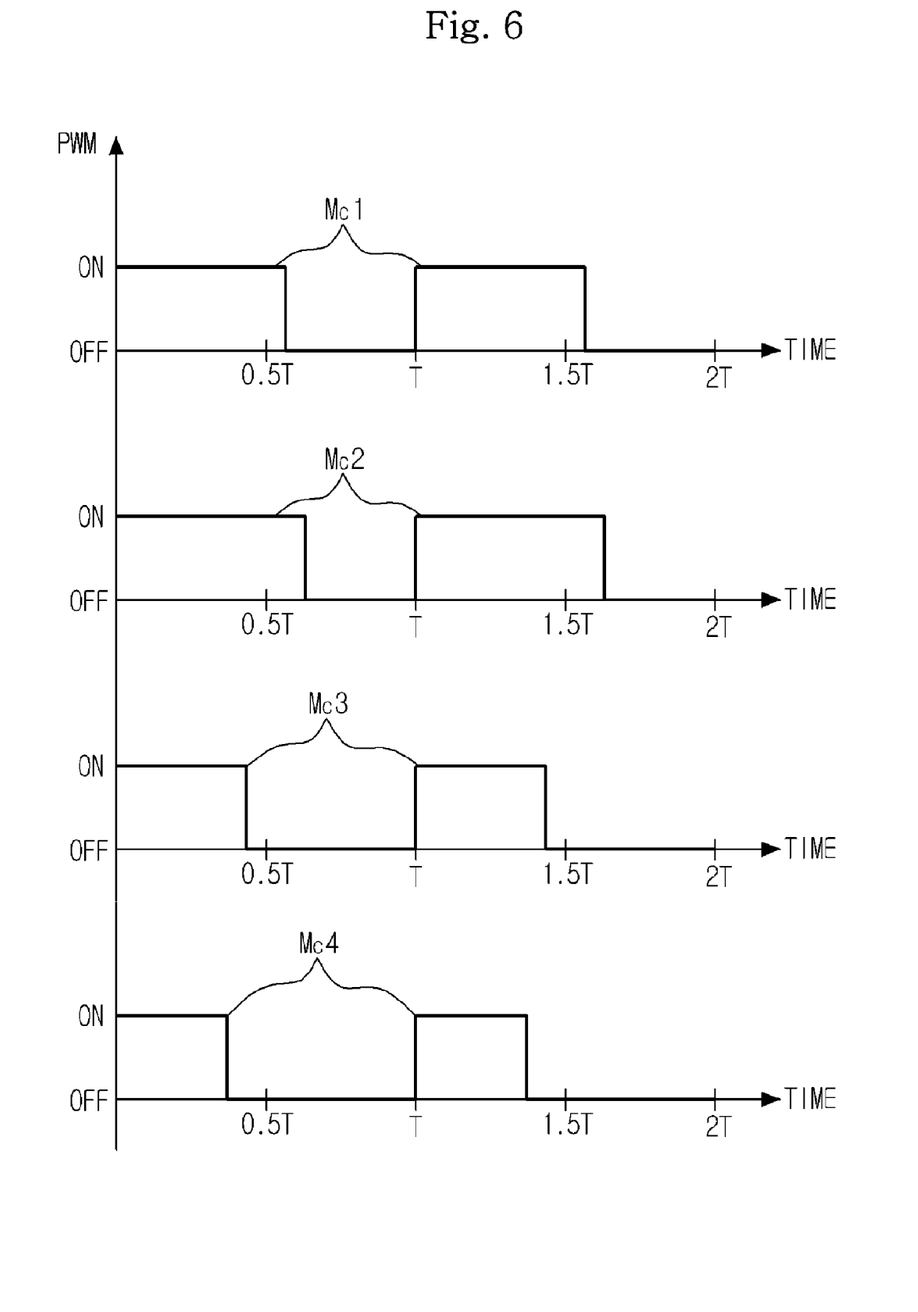
FIG. 6 is a view illustrating a pulse width modulation for driving a light source in order to obtain a plurality of reference patches for selecting a print density by a user according to an example embodiment of the present invention.

To assist in setting the print density by the user, the user may print the reference patch according to a plurality of test print densities and may select a corresponding print density from the printed results to set the selected print density as a print density of the image forming apparatus 100. For example, as shown in FIG. 5, the user applies two increased optical powers Lc1 and Lc2, greater than the reference optical power Lr, and two optical powers Lc3 and Lc4, less than the reference optical power, to perform the test printing. The user selects a desired optical power from the printed reference patches. In another example, shown in FIG. 6, the user applies two increased pulse width modulation signals Mc1 and Mc2, longer than the reference pulse width modulation signal Mr, and two decreased pulse width modulation signals Mc3 and Mc4, shorter than the reference pulse width modulation signal Mr, to perform the test printing. The user selects a desired optical power from the printed reference patches.

Figure 7:
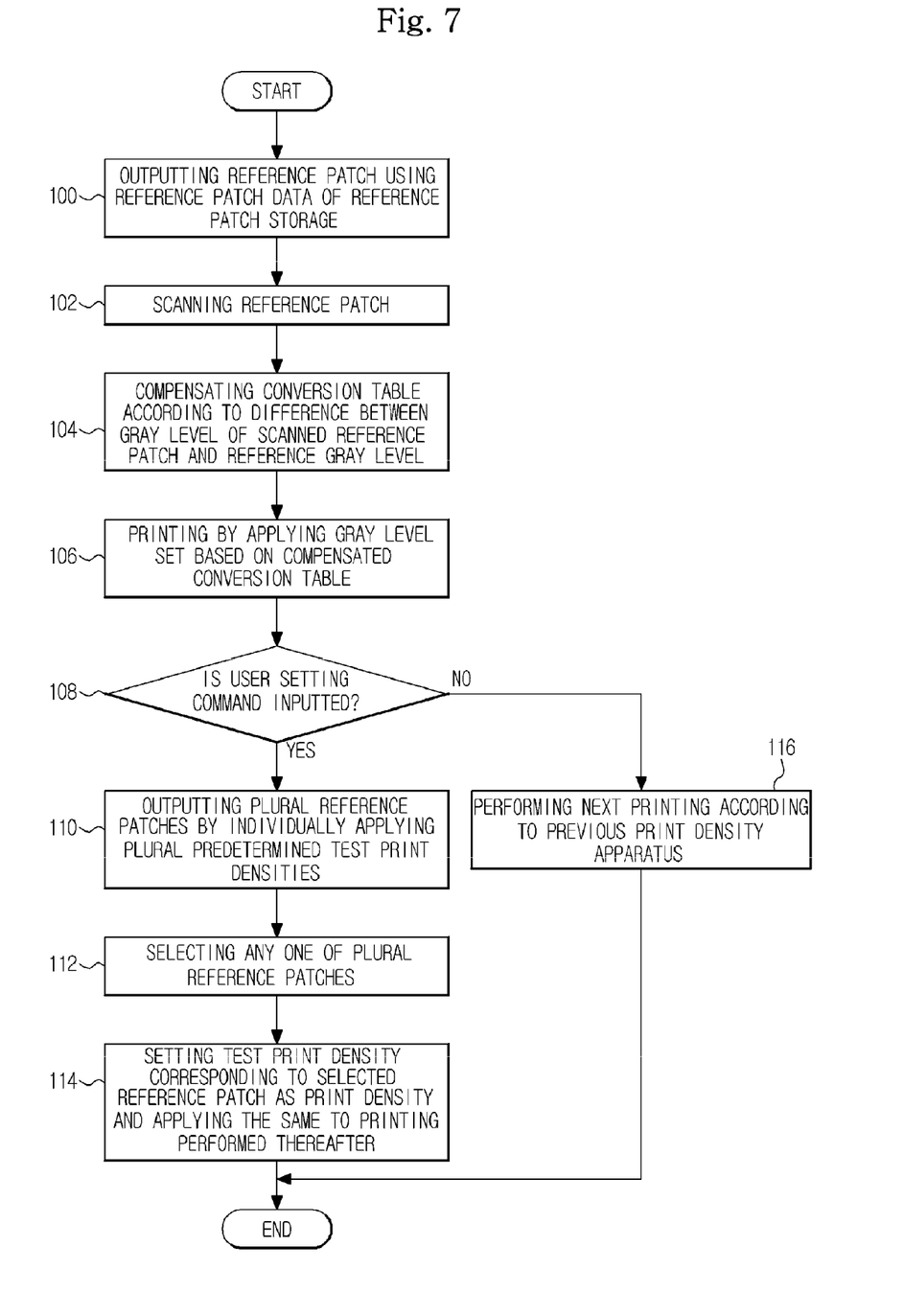
FIG. 7 is a flowchart illustrating a control method of an image forming apparatus according to an example embodiment of the present invention.

Operation of the image forming apparatus 100, according to an example embodiment of the present invention, will now be described with reference to FIG. 7. Color component data is inputted through the image input unit 10 and is converted into the print data. The color difference is compensated and the gray level is set. Since the initially-stored gray level may not be proper due to various factors, as described above, the gray level may need to be adjusted.

To adjust the gray level properly, at block 100 the reference patches are printed by the printer engine 60, based on the information about the reference optical density patches. Each reference patch corresponds to a predetermined grade stored in the reference patch storage 20. The printed reference patches are scanned by the image input unit 10 at block 102. The gray level compensator 36 compensates the gray level setting information of the conversion table 35 according to the difference between the gray level of the scanned reference patches and the pre-stored reference level at block 104. For example, in order to compensate for the difference between the reference curve Rr and the target curve Ro, as shown in FIG. 2b, the gray level setting information is modified based on the compensation curve Rc symmetrical to the target curve Ro about the reference curve Rr. Printing is performed by applying the gray level set based on the compensated conversion table at block 106.

Whether the user setting command for setting the print density is inputted by the user is determined at block 108. If the user setting command is inputted, the plural predetermined test print densities are individually applied to print the plural reference patches at block 110. Any one of the plural test print densities may be selected, such as varying the optical power applied to the light source and/or varying the pulse width of the pulse width modulation signal applied to the light source as a driving signal.

At block 112, one of the printed reference patches is selected. A test print density corresponding to the selected reference patch is set to the print density of the image forming apparatus 100. The selected reference patch and the selected print density are applied to future printing operations at block 114. If the user setting command is not inputted, the printing is performed according to a previously-set print density of the image forming apparatus 100 at block 116.

As described above, according to aspects of the present invention, the printed reference patches are scanned to compensate and/or correct the gray level setting, so that it is possible to effectively manage situations where the gray level setting information initially stored in the conversion table is changed due to various factors.

According to aspects of the present invention, the change of the optical power applied to the light source for the exposure, the change of the pulse width modulation signal applied to the light source, and the setting of the print density can be easily processed by the user interface.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, a method of compensating for errors in a printed image may include printing a plurality of reference patches; scanning the plurality of reference patches; comparing gray levels of the plurality of reference patches with a reference gray level; adjusting a gray level conversion table so as to compensate for differences between the gray levels of the plurality of reference patches and the reference gray level; and printing an image based on the adjusted gray level conversion table. Alternatively, the method may include receiving a command from a user to set a print density; adjusting a property of a light source used to print an image according to the set print density; and printing an image having the set print density. Accordingly, it is intended, therefore, that the present invention not be limited to the various example embodiments disclosed, but that the present invention includes all embodiments falling within the scope of the appended claims.

What is claimed is:

1. An image forming apparatus comprising:
   a printer engine to print an image onto a printable medium;
   a reference patch storage unit to store gray level reference patch data for compensating a gray level of an outputted image of the printer engine separate from a compensating for a color difference;
   an image input unit to input color component data, convert the color component data into print data, compensate for a color difference, set a gray level, and to scan a gray level reference patch printed based on the gray level reference patch data; and
   an image processor to set a gray level of print data according to a result of comparing gray level information obtained from the scanned gray level reference patch with reference gray level information,
   wherein the image processor comprises a gray level compensator to modify the gray level setting information based on a compensation curve symmetrical to a target curve about a reference curve.

2. The image forming apparatus according to claim 1, wherein the gray level compensator modifies the stored information such that a print density of a grade of the print data varies linearly.

3. The image forming apparatus according to claim 1, wherein the image processor further comprises:
   a conversion table to store gray level setting information.

4. An image forming apparatus comprising:
   a printer engine to print an image onto a printable medium;
   a reference patch storage unit to store gray level reference patch data for adjusting print data corresponding to the image to be printed by the printer engine;
   an image input unit to scan the gray level reference patch printed based on the gray level reference patch data and to receive color component-gray level data corresponding to the print data;
   an image processor to convert the gray level data into the print data and modify the gray level setting information based on a compensation curve symmetrical to a target curve about a reference curve;
   a printer engine controller to provide the print data to the printer engine and to control the printer engine according to a user setting command; and
   a user interface to provide, to the printer engine controller, the user setting command for setting a gray level print density separate from a color compensation of the image forming apparatus.

5. The image forming apparatus according to claim 4, wherein:
   the printer engine comprises a light source and
   the user interface sets an intensity of an optical power applied to the light source corresponding to the gray level print density.

6. The image forming apparatus according to claim 5, wherein the printer engine controller makes intensities of optical powers, applied to the light source, different from each other according to the gray level print density to perform a test printing of a plurality of reference charts, and sets the gray level print density selected by a user.

7. The image forming apparatus according to claim 4, wherein:
   the printer engine comprises a light source; and
   the user interface sets a pulse width of a pulse width modulation signal for driving the light source corresponding to the gray level print density.

8. The image forming apparatus according to claim 7, wherein the printer engine controller makes pulse widths of pulse width modulation signals, applied to the light source, different from each other according to the gray level print density to perform a test printing of a plurality of reference charts, and sets the gray level print density selected by a user.

9. A control method of an image forming apparatus comprising a printer engine to receive print data and print an image corresponding to the print data onto a printable medium, the control method comprising:
   printing a gray level reference patch based on gray level reference patch data for compensating an image printed by the printer engine;
   scanning the pray level printed reference patch;
   adjusting a conversion table to store gray level setting information according to a difference between a gray level obtained from the scanned gray level reference patch and a pre-stored reference gray level separate from a color compensation; and printing the image by applying a gray level set based on the adjusted conversion table, and wherein the adjusting a conversion table is to modify the gray level setting information based on a compensation curve symmetrical to a target curve about a reference curve.

10. The control method according to claim 9, wherein storage information of the conversion table is modified such that an optical gray level density to a grade of the print date varies linearly.

11. A method of compensating for errors in a printed image, the method comprising:
   printing a plurality of gray level reference patches;
   scanning the plurality of gray level reference patches;
   comparing gray levels of the plurality of gray level reference patches with a reference gray level;
   adjusting a gray level conversion table so as to compensate for differences between the gray levels of the plurality of gray level reference patches and the reference gray level; and
   printing an image based on the adjusted gray level conversion table, and
   wherein the adjusting a gray level conversion table is to modify the gray level setting information based on a compensation curve symmetrical to a target curve about a reference curve.

12. The method according to claim 11, wherein an optical power of a light source is adjusted based on the adjusted gray level conversion table so as to print the image.

13. The method according to claim 11, wherein a pulse width of a light source is adjusted based on the adjusted gray level conversion table so as to print the image.

14. An image forming apparatus, comprising:
   a printer engine to print an image onto a printable medium;
   an image input unit to scan a plurality of gray level reference patches printed by the printer engine;
   an image processor to set a pray level of print data based on a comparison of the plurality of gray level reference patches with reference gray level information, and
   wherein the image processor comprises a gray level compensator to modify the gray level setting information based on a compensation curve symmetrical to a target curve about a reference curve.

15. The image forming apparatus of claim 14, further comprising:
   a reference patch storage unit to store reference patch data corresponding to the plurality of reference patches.

16. The image forming apparatus of claim 14, wherein the image processor comprises:
   a conversion table to store gray level setting information; and
   a gray level compensator to modify the gray level setting information based on the comparison of the plurality of reference patches with the reference gray level information.

17. The image forming apparatus of claim 14, further comprising:
   a printer engine controller to control the printer engine based on the gray level set by the print data.

18. The image forming apparatus of claim 17, wherein the printer engine controller controls an optical power of a light source included in the printer engine based on the gray level.

19. The image forming apparatus according to claim 17, wherein the printer engine controller controls a pulse width modulation signal to drive a light source included in the printer engine based on the gray level.

\* \* \* \* \*